United States Patent [19]

Hosaka et al.

[11] Patent Number: 5,347,799
[45] Date of Patent: Sep. 20, 1994

[54] MOTOR VEHICLE BODY PANELING

[75] Inventors: Jun Hosaka, Kanagawa; Hiroshi Moriyama, Saitama, both of Japan; Tatsuya Tokuda, Columbus, Ohio

[73] Assignee: Honda Giken Hogyo Kabishiki Kaisha, Tokyo, Japan

[21] Appl. No.: 2,499

[22] Filed: Jan. 6, 1993

[30] Foreign Application Priority Data

Jan. 10, 1992 [JP] Japan ................... 4-021757

[51] Int. Cl.$^5$ .................... A01D 34/64; B62D 29/04
[52] U.S. Cl. ................. 56/15.8; 56/DIG. 6; 180/89.17; 296/197; 296/901
[58] Field of Search .............. 56/15.8, 11.8, DIG. 6, 56/DIG. 14; 296/187, 901, 193, 197; 180/89.17, 69.2

[56] References Cited

U.S. PATENT DOCUMENTS

| | | | |
|---|---|---|---|
| 3,796,277 | 3/1974 | Gordon | 180/54 A |
| 4,809,489 | 3/1989 | Johansson | 56/14.7 |
| 5,174,627 | 12/1992 | Cleereman et al. | 296/187 |
| 5,218,814 | 6/1993 | Teal et al. | 56/DIG. 6 |
| 5,238,267 | 8/1993 | Hutchinson et al. | 296/901 X |

FOREIGN PATENT DOCUMENTS

| | | | |
|---|---|---|---|
| 0518201 | 12/1992 | European Pat. Off. | 296/901 |
| 62-16517 | 1/1987 | Japan . | |

Primary Examiner—Terry Lee Melius
Attorney, Agent, or Firm—Howard L. Rose

[57] ABSTRACT

A riding-type powered lawn mower has a frame, front and rear wheels rotatably mounted on the frame, an engine mounted on the frame for rotating the rear wheels, a cutter deck mounted on the frame and housing a cutter blade drivable by the engine, a driver's seat mounted on the frame by a seat bracket in front of the engine, and a steering column mounted on the frame forwardly of the driver's seat. The riding-type powered lawn mower also has a body paneling mounted on the frame. The body paneling comprises a unitary front body cover covering the steering column, the seat bracket, and a front portion of the engine, and a unitary rear hood detachably connected to a rear end of the front body cover and covering a rear portion of the engine.

17 Claims, 6 Drawing Sheets

MOTOR VEHICLE BODY PANELING

BACKGROUND OF THE INVENTION

1. Field of the Invention

The present invention relates to a body paneling for use on a motor vehicle such as a riding-type powered lawn mower.

2. Description of the Prior Art

Japanese laid-open utility model publication No. 62-16517 discloses a riding-type powered lawn mower comprising a vehicle frame, an engine mounted on a rear portion of the vehicle frame, a cover covering the engine and its accessories, and a driver's seat mounted on an upper portion of the cover.

For servicing the engine and the accessories of the disclosed riding-type powered lawn mower for maintenance, it is necessary to remove the cover in its entirety in order for the operator to be able to access the engine and the accessories.

SUMMARY OF THE INVENTION

It is therefore an object of the present invention to provide a body paneling for motor vehicles which allows an engine and its accessories to be easily serviced for maintenance.

According to the present invention, there is provided a body paneling in a motor vehicle having a vehicle frame, a prime mover mounted on the vehicle frame for propelling the motor vehicle, and a driver's seat mounted on the vehicle frame, the body paneling comprising a front body cover mounted on the vehicle frame, the driver's seat being positioned above the front body cover, the prime mover having a portion covered by the front body cover, and a rear hood positioned behind the driver's seat and detachably connected to the front body cover, the rear hood extending above and covering another portion of the prime mover.

According to the present invention, there is also provided a riding-type lawn mower comprising a frame, a driver's seat mounted on the frame, an engine mounted on a rear portion of the frame and having a downwardly extending crankshaft and a cylinder block directed rearwardly, at least one front wheel rotatably mounted on the frame, a pair of rear wheels rotatably mounted on the frame, a transmission disposed between and operatively coupled to the rear wheels, the crankshaft being positioned forwardly of the transmission, a cutter device mounted on and disposed beneath the vehicle frame between the front and rear wheels, the cutter device being positioned forwardly of the crankshaft, a first belt-and-pulley mechanism operatively connecting the crankshaft to the transmission, and a second belt-and-pulley mechanism operatively connecting the crankshaft to the cutter device.

According to the present invention, there is also provided a riding-type lawn mower comprising a frame, front and rear wheels rotatably mounted on the frame, a cutter deck mounted on and disposed below the frame between the front and rear wheels, a steering column mounted on a front portion of the frame, a driver's seat mounted on a central portion of the frame, a prime mover mounted on a rear portion of the frame, and a body paneling integrally molded of a synthetic resin material and mounted on the frame, the body paneling including a steering column cover member extending around the steering column, a floor panel extending rearwardly from the steering column, a seat cowl joined to the floor panel and extending up to the driver's seat, and a rear cowl extending rearwardly from the floor panel and covering the prime mover behind the driver's seat.

According to the present invention, there is further provided a motor vehicle comprising a vehicle frame, a plurality of wheels rotatably mounted on the vehicle frame, a prime mover mounted on the vehicle frame for rotating the wheels, a driver's seat mounted on the vehicle frame by a seat bracket in front of the prime mover, a steering column mounted on the vehicle frame forwardly of the driver's seat, and a body paneling mounted on the vehicle frame, the body paneling comprising an integrally molded front body cover covering the steering column, the seat bracket, and a front portion of the prime mover, and an integrally molded rear hood detachably connected to a rear end of the front body cover and covering a rear portion of the prime mover.

According to the present invention, there is also provided a body paneling in a riding-type powered lawn mower having a frame, front and rear wheels rotatably mounted on the frame, an engine mounted on the frame for rotating the rear wheels, a cutter deck mounted on the frame and housing a cutter blade drivable by the engine, a driver's seat mounted on the frame by a seat bracket in front of the engine, and a steering column mounted on the frame-forwardly of the driver's seat, the body paneling being mounted on the frame and comprising a unitary front body cover covering the steering column, the seat bracket, and a front portion of the engine, and a unitary rear hood detachably connected to a rear end of the front body cover and covering a rear portion of the engine.

The front body cover has an air inlet hole defined in a rear portion thereof behind the driver's seat for supplying air to the engine, the rear hood having a louver panel placed over the air inlet hole and having air inlet slots. The rear hood also has a tail member covering the rear portion of the engine, the louver panel extending forwardly from a front edge of the tail member.

One of the front body cover and the rear hood has hook means for separably joining the front body cover and the rear hood to each other. Alternatively, the front body cover may have a pair of recesses defined in rear side portions thereof, and the rear hood has a pair of rear fenders extending forwardly and removably fitted in the recesses, respectively.

The front body cover comprises a steering column cover member projecting upwardly and covering the steering column, a floor panel extending rearwardly from the steering column cover member, a seat cowl extending upwardly from a rear end of the floor panel and covering the seat bracket, and a rear cowl extending around the seat cowl and covering the front portion of the engine.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

The principles of the present invention are particularly useful when embodied in a body paneling for various motor vehicles, and are especially advantageous when embodied in a body paneling for a riding-type powered lawn mower as shown in illustrated embodiments.

The terms "forwardly", "rearwardly", "upwardly", "downwardly", and other similar words indicating directions are used herein with respect to the geometric center of a riding-type powered lawn mower which embodies the principles of the present invention.

Figure 1:
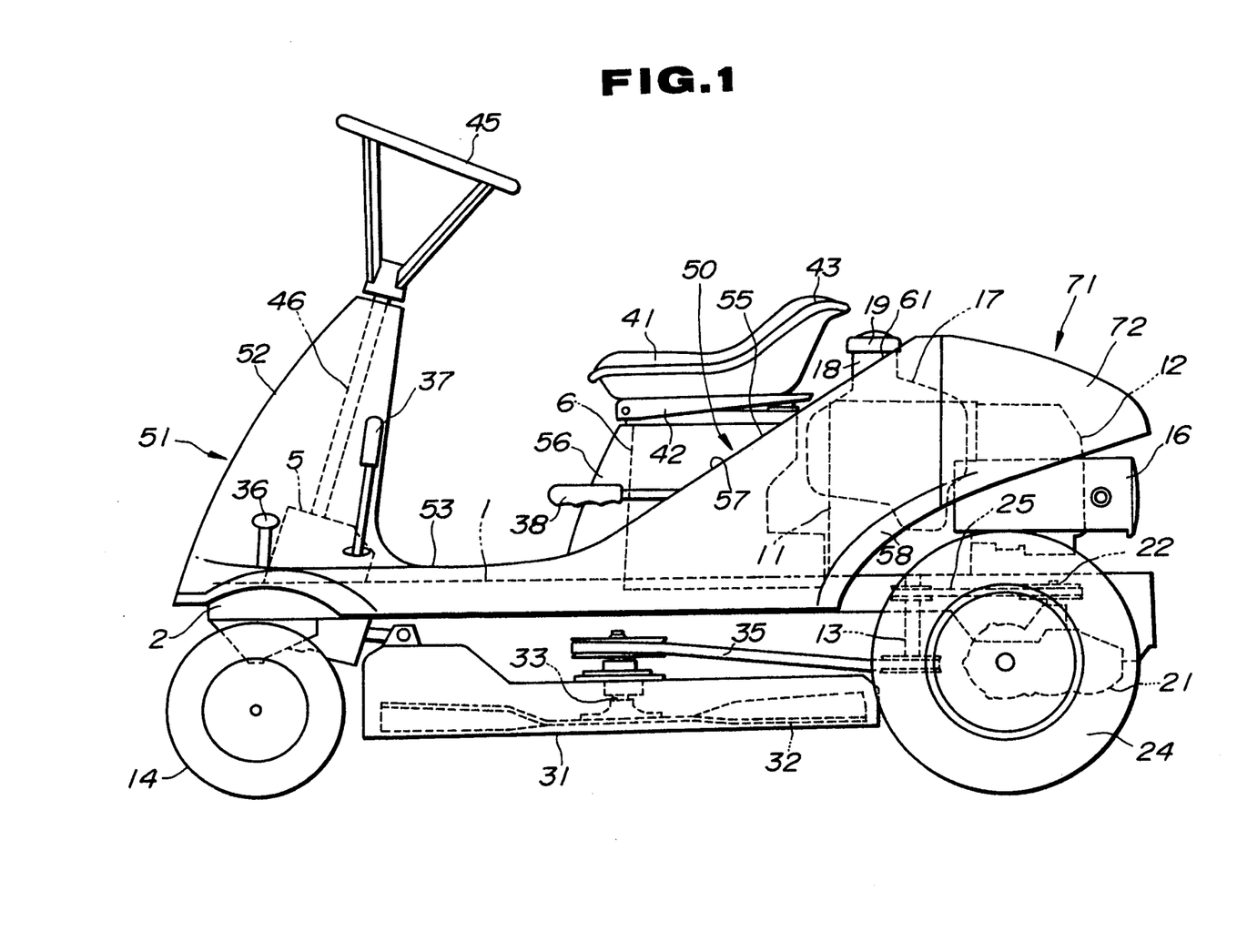
FIG. 1 is a side elevational view of a riding-type powered lawn mower which includes a body paneling according to an embodiment of the present invention.
Figure 2:
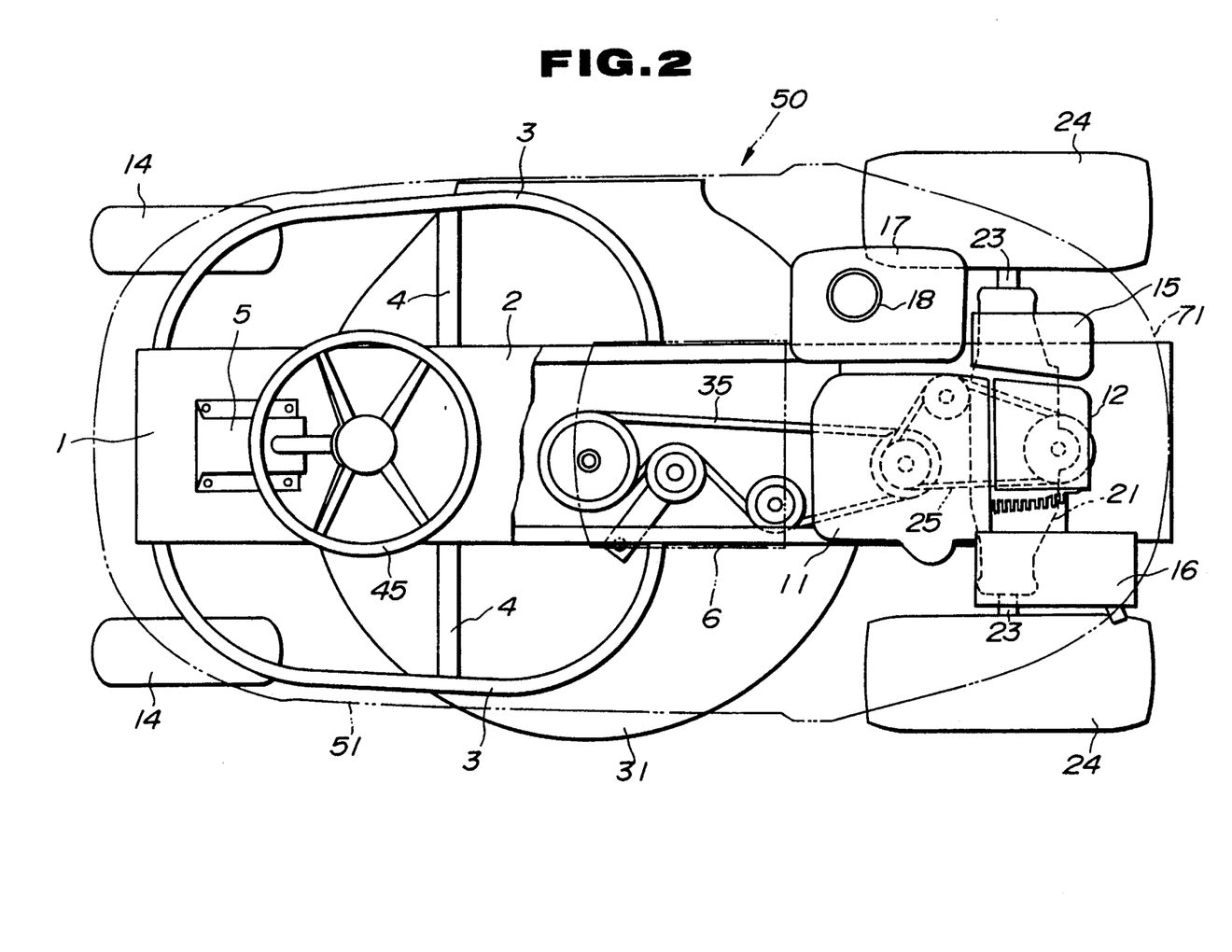
FIG. 2 is a plan view of the riding-type powered lawn mower shown in FIG. 1, with the body paneling being shown by imaginary lines.

FIGS. 1 and 2 show a riding-type powered lawn mower which generally includes a vehicle frame 1, an engine 11, a transmission 21, a cutter deck 31, a driver's seat 41, and a body paneling 50.

The engine 11 has a cylinder block 12, and is mounted on a rear portion of the vehicle frame 1 with the cylinder block 12 directed rearwardly. The engine 11 also has a downwardly projecting, vertical crankshaft 13 positioned behind the cutter deck 31 which is supported by and disposed beneath the vehicle frame 1 between front and rear wheels 14, 24 that are rotatably mounted on the vehicle frame 1. The crankshaft 13 is positioned in front of the transmission 21 which is located below the vehicle frame 1 between the right and left rear wheels 24.

The transmission 21 has an upwardly projecting input shaft 22 and laterally projecting rear wheel drive shafts 23 that are coupled to the right and left rear wheels 24, respectively.

The cylinder block 12 of the engine 11 is positioned transversely between an air cleaner 15 and a muffler 16. A fuel tank 17 is disposed in front of the air cleaner 15 on the righthand side of the engine 11.

The cutter deck 31 houses a cutter blade 32 rotatable in a substantially horizontal plane by a vertical shaft 33 rotatably supported on the cutter deck 31 and having an upper end projecting upwardly beyond the cutter deck 31. The crankshaft 13 is operatively coupled to the input shaft 22 of the transmission 21 by a belt-and-pulley mechanism 25. The upper end of the vertical shaft 33 is operatively coupled to the lower end of the crankshaft 13 by a belt-and-pulley mechanism 35.

The driver's seat 41 is positioned forwardly of the engine 11 and mounted on a substantially central portion of the vehicle frame 1.

The vehicle frame 1 comprises a frame body 2 composed of bent iron panels and elongate in the longitudinal direction of the lawn mower, a pair of floor pipes 3 is the form of bent rectangular iron pipes having front and rear ends joined to lateral sides of a front portion of the frame body 2, a pair of floor mount plates 4 of iron extending laterally between the frame body 2 and the floor pipes 3, a steering base 5 of bent iron panels mounted vertically on the front portion of the frame body 2, and a seat bracket 6 of a bent iron panel mounted vertically on the central portion of the frame body 2.

Figure 3:
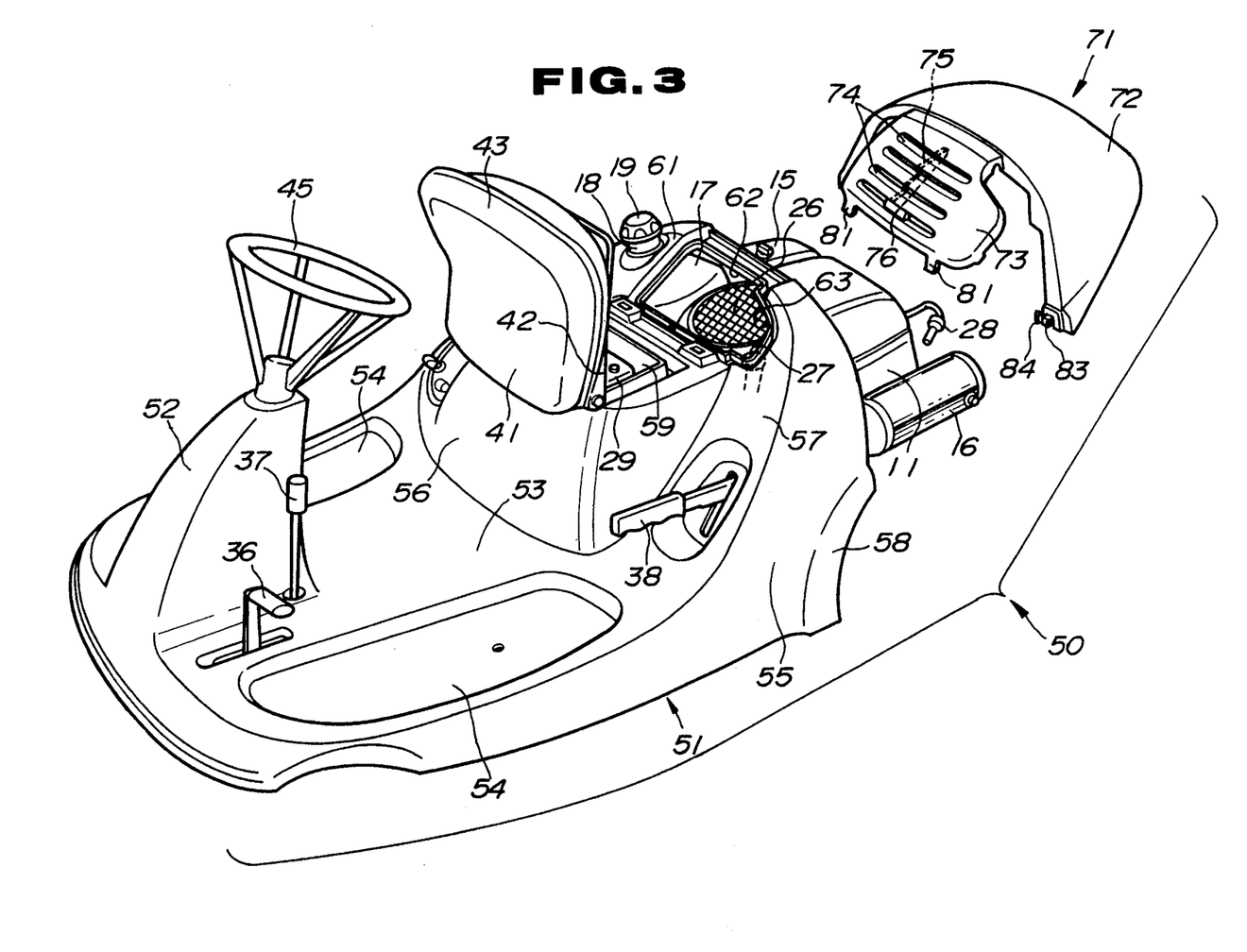
FIG. 3 is an exploded perspective view of the body paneling.

As also illustrated in FIG. 3, the body paneling 50 comprises a front body cover 51 and a rear hood 71. The front body cover 51, which is integrally molded of a synthetic resin material such as polypropylene, for example, comprises a steering column cover member 52 covering a substantially vertical steering column 46 with a steering wheel 45 mounted on its upper end, a floor panel 53 extending laterally and rearwardly from the steering column cover member 52 and including right and left foot steps 54, and a rear cover member or rear cowl 55 extending rearwardly from the floor panel 53 around a seat cowl 56 that is positioned beneath the driver's seat 41 and around the seat bracket 6. The rear cover member 55 covers upper and lateral sides of a front portion of the engine 11 behind the seat cowl 56.

More specifically, the floor panel 53 has a front portion continuously joined to lateral sides of the steering column cover member 52, and a rear portion continuously joined to inclined side panels 57 of the rear cover member 55 which are positioned laterally of the seat cowl 56. The side panels 57 are inclined upwardly in the rearward direction. The rear cover member 55 has a pair of rear fenders 58 covering upper portions of the rear wheels 24, respectively.

The seat cowl 56 has an upwardly open battery box 59 positioned within the seat bracket 6 below the driver's seat 41. The rear cover member 55 has an inclined upper panel 61 which is contiguous to the inclined side panels 57 and positioned behind the driver's seat 41. The upper panel 61, which is inclined upwardly in the rearward direction, has an air inlet hole 62 defined therein, as also shown in FIG. 4.

Figure 4:
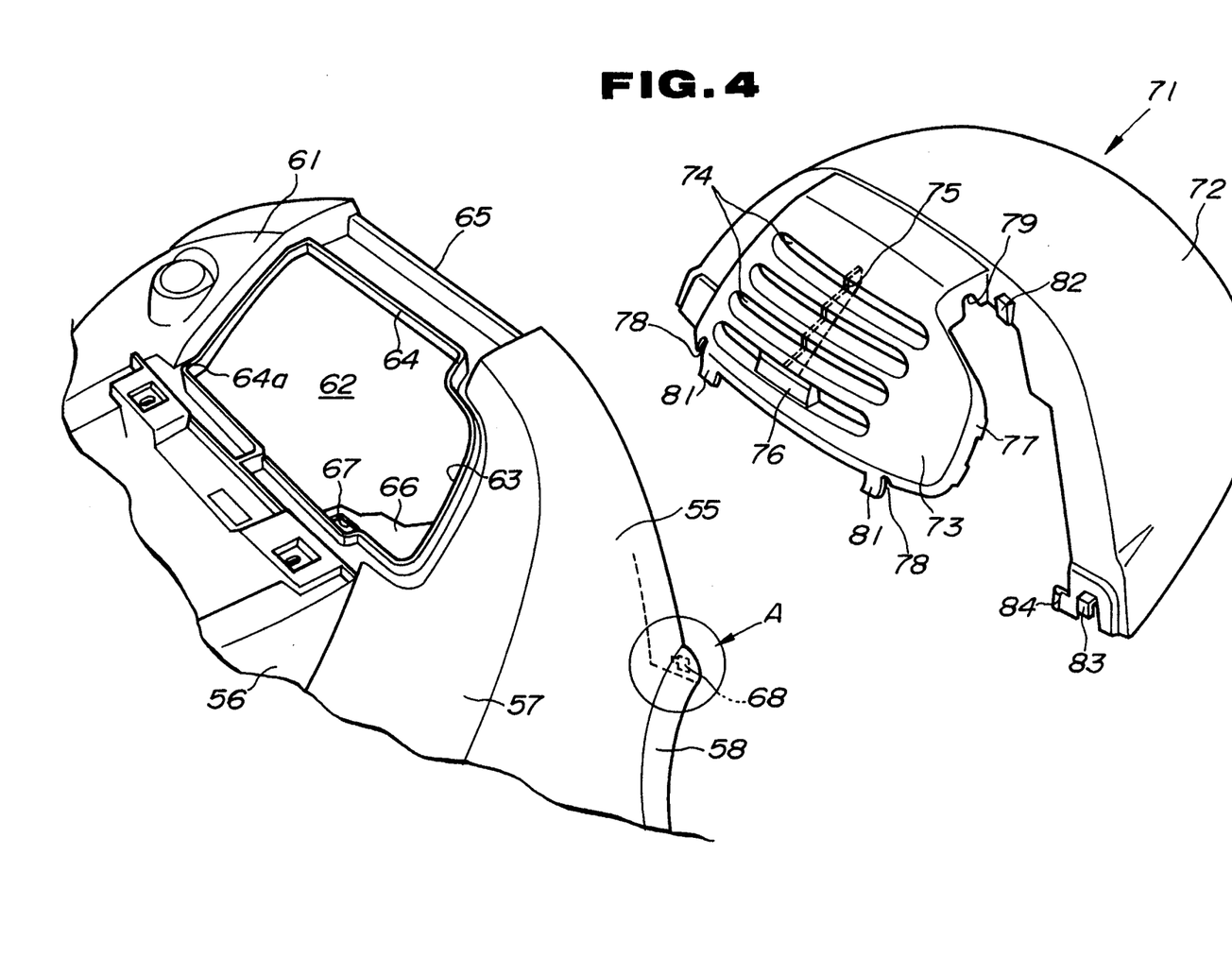
FIG. 4 is an enlarged fragmentary exploded perspective view of the body paneling.

In FIG. 4, the air inlet hole 62 has a leftward extension 63, and is defined by a vertical flange 64 of the rear cover member 55 which extends fully around the air inlet hole 62. The rear cover member 55 has a transversely straight stiffening rib 65 positioned behind the air inlet hole 62, and a stiffening member 66 positioned in a front portion of the leftward extension 63 of the air inlet hole 62.

As shown in FIGS. 1 and 3, the front body cover 51 is mounted on and fastened to the vehicle frame 1. The seat cowl 56 is joined to the seat bracket 6, and a seat attachment 42 to which the driver's seat 41 is attached is angularly movably joined at its front end to an upper edge of the seat cowl 56 by a hinge.

The fuel tank 17 has an upwardly extending filler neck 18 whose upper end portion projects upwardly through the inclined upper panel 61 of the rear cover member 55 on the righthand side of the air inlet hole 62. The upper end of the filler neck 18 is normally closed by a filler cap 19.

As shown in FIG. 3, a dust screen 26 is positioned above the engine 11 below the air inlet hole 62. The engine 11 has an oil filler cap 27 which is positioned in the leftward extension 63 of the air inlet hole 62 laterally of the dust screen 26.

In FIG. 3, the engine 11 has spark plug caps 28. The lawn mower also has a battery 29 housed in the battery box 59, a control pedal 36 positioned laterally of the steering column cover member 52, a control lever 37 also positioned laterally of the steering column cover member 52, and a control lever 38 positioned on the lefthand inclined panel 57 of the rear cover member 55. The battery box 59 also houses fuses (not shown).

The rear hood 71 is detachably connected to a rear side of the rear cover member 55.

More specifically, as shown in FIGS. 1, 3, and 4, the rear hood 71, which is integrally molded of a synthetic resin material such as polypropylene, for example, comprises a partly dome-shaped tail member 72 having front upper and side edges to be joined to the rear side of the rear cover member 55, and an inclined louver panel 73 extending contiguously forwardly and obliquely downwardly from the front upper edge of the tail member 72 for covering the air inlet hole 62 from above. The louver panel 73 has a louver including parallel air inlet slots 74, and is reinforced by a vertical rib 75 extending across the air inlet slots 74 and a stiffening bar 76 joined to the lower end of the vertical rib 75 and fitted in the lowest air inlet slot 74.

The louver panel 73 also has a downwardly extending peripheral wall 77 (FIG. 4) which will be positioned outside of the flange 64 along its vertical portions when the rear hood 71 is joined to the rear cover member 55 and the louver panel 73 covers the air inlet hole 62. The peripheral wall 77 has lower recesses 78 defined in its lower edge for receiving the flange 64, and upper recesses 79 defined in its upper edge for receiving the rib 65. The peripheral wall 77 also has a pair of downwardly projecting teeth 81 on its lower edge.

The tail member 72 has a pair of guide wedges 82 on its front upper edge adjacent to the respective upper recesses 79, and also a downward hook 83 and an inward hook 84 mounted on each of the front side edges of the tail member 72 at their lower ends.

Figure 5:
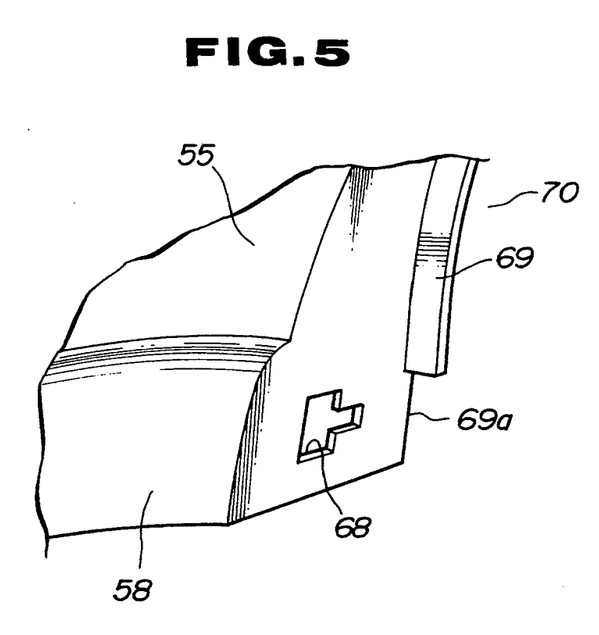
FIG. 5 is an enlarged fragmentary exploded perspective view of a portion enclosed by a circle A in FIG. 4.

The rear cover member 55 has an engagement hole 67 defined in a front portion of the stiffening member 66 in the leftward extension 63 of the air inlet hole 62. The rear cover member 55 also has a pair of engagement holes 68 (see also FIG. 5) defined respectively in laterally spaced lower surfaces of the rear side of the rear cover member 55. Each of the engagement holes 68 is of a shape as shown in FIG. 5. In FIG. 5, the rear cover member 55 has inner flanges 69 (only one shown) extending along respective inner edges of the laterally spaced lower surfaces of the rear side thereof around an opening 70 defined in the rear side of the rear cover member 55, the inner flanges 09 being cut away at their lower ends, providing respective inner flange-free edges 69a.

The rear hood 71 is attached to the rear cover member 55 as follows: The louver panel 73 is placed over the air inlet hole 62, and the righthand tooth 81 is brought into abutment against a righthand flange portion 64a of the flange 64 and the lefthand tooth 81 is inserted into the engagement hole 67 in the stiffening member 66. At this time, the righthand flange portion 64a and the flange portion near the engagement hole 67 are received in the respective lower recesses 78 of the louver panel 73, and the stiffening rib 65 is received in the upper recesses 79 of the louver panel 73.

The tail member 72 is then brought up against the rear side of the rear cover member 55. The guide wedges 82 are held against the upper edge of the rear side of the rear cover member 55 above the opening 70, and the downward hooks 83 are inserted into the respective engagement holes 68, and the inward hooks 84 are fitted over the respective inner flange-free edges 69a.

In this manner, the rear hood 71 can easily be attached to and detached from the rear cover member 55 through interfitting engagement. When the rear hood 71 is joined to the rear cover member 55, the rear hood 71 covers a rear portion of the engine 11, the air cleaner 15, the muffler 16, the fuel tank 17, and other accessories.

To service the engine 11, the air cleaner 15, the muffler 16, the fuel tank 17, and other accessories, the operator simply detaches the rear hood 71 from the rear cover member 55 for accessing the engine 11 and the accessories for maintenance. Therefore, the engine 11, the air cleaner 15, the muffler 16, the fuel tank 17, and other accessories can easily be serviced, inspected, and repaired simply by removing the rear hood 71.

When the rear hood 71 is mounted in position and connected to the rear cover member 55, they jointly appear as the body paneling 50 with a smooth, continuous, and integral appearance. The air inlet slots 74 of the louver panel 73 can introduce fresh air from behind a seatback 43 of the driver's seat 41 into the rear cover member 55, in which the air is supplied as intake air to the engine 11.

Figure 6:
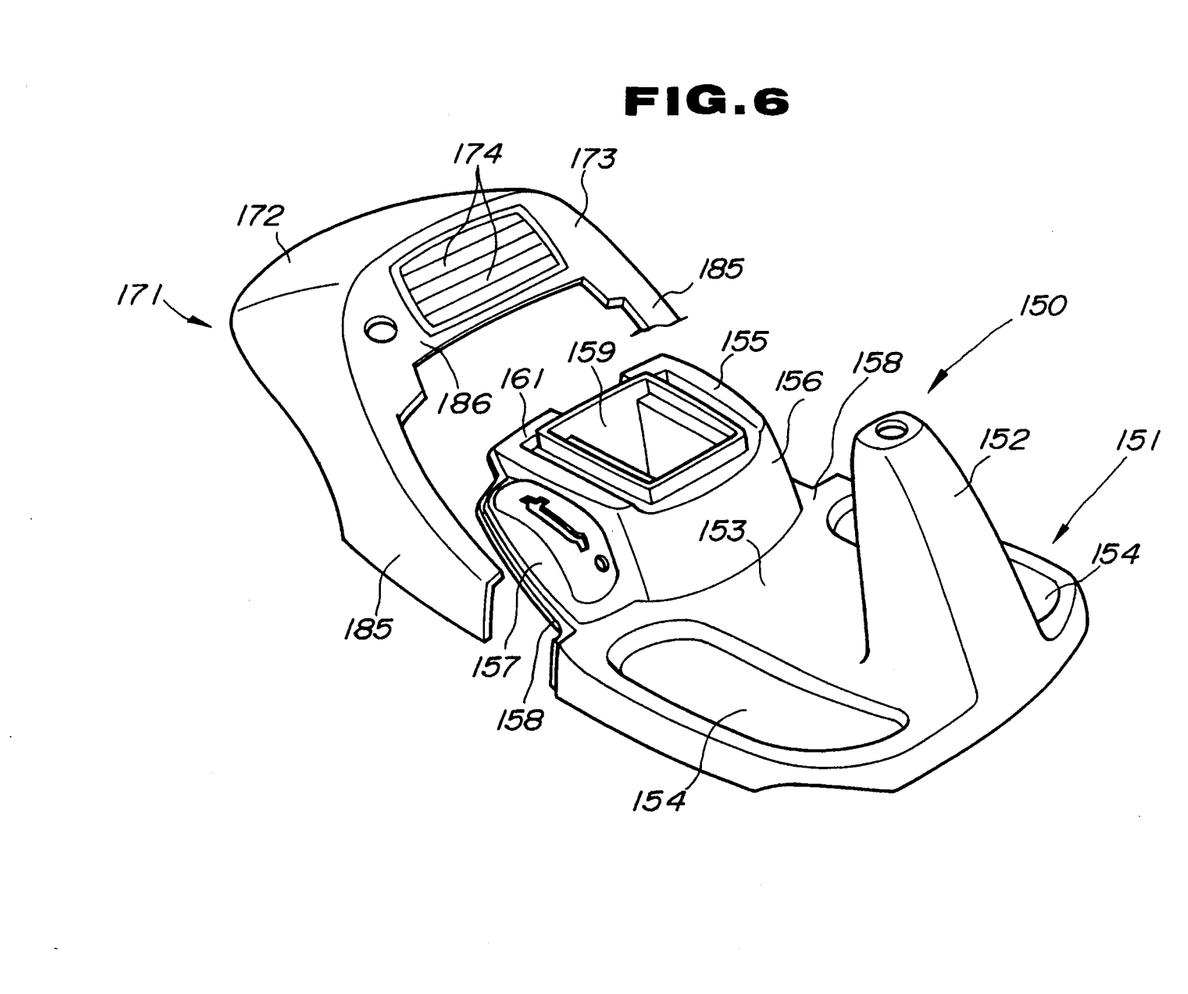
FIG. 6 is a perspective view of a body paneling according to another embodiment of the present invention.

FIG. 6 shows a body paneling 150 according to another embodiment of the present invention. The body paneling 150 comprises a front body cover 151 and a rear hood 171 detachably connected thereto. The front body cover 151 has a steering column cover member 152, a floor panel 153 with foot steps 154, and a rear cover member 155 having a seat cowl 156 with a battery box 159. The rear cover member 155 also has inclined side panels 157 extending alongside of the seat cowl 156, and side recesses 158 defined laterally of the inclined side panels 157, respectively. The rear cover member 155 also has a rear marginal edge 161 extending rearwardly from the seat cowl 156 behind the battery box 159. The rear hood 171 has a tail member 172, a louver panel 173 extending forwardly from the tail member 172 and has air inlet slots 174, and a pair of rear fenders 185 extending forwardly from lateral sides of the tail member 172. The rear hood 171 also has a front inclined panel 186 joined to the louver panel 173 and extending downwardly forwardly. When the rear hood 171 is attached to the front body cover 171, the rear fenders 185 are fitted in the side recesses 158, respectively, and the rear marginal edge 161 abuts against the front edge of the front inclined panel 186. Consequently, the rear hood 171 can easily be joined to the front body cover 171 simply by bringing the rear fenders 185 into the respective recesses 158 until the rear marginal edge 161 engages the front edge of the front inclined panel 186.

While the principles of the present invention have been described as being embodied in a body paneling for a riding-type powered lawn mower, the present invention is also applicable to body panelings for other motor vehicles.

The riding-type powered lawn mower may employ an electric motor as a prime mover instead of the engine 11, and may have various specific structures different from those illustrated.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. In a motor vehicle having a vehicle frame, a prime mover mounted on said vehicle frame for propelling the motor vehicle, and a driver's seat mounted on said vehicle frame, a body paneling comprising:
   a front body cover mounted on said vehicle frame, said driver's seat being positioned above said front body cover, said prime mover having a portion covered by said front body cover; and
   a rear hood positioned behind said driver's seat and detachably connected to said front body cover, said rear hood extending above and covering another portion of said prime mover.

2. A body paneling according to claim 1, wherein said rear hood has an inclined panel disposed behind said driver's seat and extending obliquely upwardly away from said driver's seat, said inclined panel having air inlet slots defined therein.

3. A body paneling according to claim 1, wherein said front body cover has recesses defined in side portions thereof and opening rearwardly, said rear hood comprises a tail member covering said other portion of the prime mover, and members extending forwardly from said tail member and fitted respectively in said recesses.

4. A body paneling according to claim 2, further comprising
   an air cleaner, a muffler and fuel tank mounted under said rear hood.

5. A riding-type lawn mower comprising:
   a frame;
   front and rear wheels rotatably mounted on frame;
   a cutter deck mounted on and disposed below said frame between said front and rear wheels;
   a steering column mounted on a front portion of said frame;
   a driver's seat mounted on a central portion of said frame;
   a prime mover mounted on a rear position of said frame; and
   a body paneling integrally molded of a synthetic resin material and mounted on said frame, said body paneling including a steering column cover member extending around said steering column, a floor panel extending rearwardly from said steering column, a seat cowl jointed to said floor panel extending up to said driver's seat and covering said prime mover from the front of the driver's seat, and a rear cowl extending rearwardly from said floor panel and covering prime mover behind said driver's seat.

6. A motor vehicle comprising:
   a vehicle frame;
   a plurality of wheels rotatably mounted on said vehicle frame;
   a prime mover mounted on said vehicle frame for rotating said wheels;
   a driver's seat mounted on said vehicle frame by a seat bracket in front of said prime mover;
   a steering column mounted on said vehicle frame forwardly of said driver's seat; and
   a body paneling mounted on said vehicle frame, said body paneling comprising an integrally molded front body cover covering said steering column, said seat bracket, and a front portion of said prime mover, and an integrally molded rear hood detachably connected to a rear end of said front body cover and covering a rear portion of said prime mover.

7. A motor vehicle according to claim 6, wherein said front body cover has an air inlet hole defined in a rear portion thereof behind said driver's seat for supplying air to said prime mover, said rear hood having a louver panel placed over said air inlet hole and having air inlet slots.

8. A motor vehicle according to claim 7, wherein said rear hood also has a tail member covering said rear portion of the prime mover, said louver panel extending forwardly from a front edge of said tail member.

9. A motor vehicle according to claim 6, wherein one of said front body cover and said rear hood has hook means for separably joining the front body cover and the rear hood to each other.

10. A motor vehicle according to claim 6, wherein said front body cover has a pair of recesses defined in rear side portions thereof, and said rear hood has a pair of rear fenders extending forwardly and removably fitted in said recesses, respectively.

11. A motor vehicle according to claim 6, wherein said front body cover comprises a steering column cover member projecting upwardly and covering said steering column, a floor panel extending rearwardly from said steering column cover member, a seat cowl extending upwardly from a rear end of said floor panel and covering said seat bracket, and a rear cowl extending around said seat cowl and covering said front portion of the prime mover.

12. In a riding-type powered lawn mower having a frame, front and rear wheels rotatably mounted on the frame, an engine mounted on said frame for rotating said rear wheels, a cutter deck mounted on said frame and housing a cutter blade drivable by said engine, a driver's seat mounted on said frame by a seat bracket in front of said engine, and a steering column mounted on said frame forwardly of said driver's seat, a body paneling mounted on said frame, said body paneling comprising a unitary front body cover covering said steering column, said seat bracket, and a front portion of said engine, and a unitary rear hood detachably connected to a rear end of said front body cover and covering a rear portion of said engine.

13. A body paneling according to claim 12, wherein said front body cover has an air inlet hole defined in a rear portion thereof behind said driver's seat for supplying air to said engine, said rear hood having a louver panel placed over said air inlet hole and having air inlet slots.

14. A body paneling according to claim 13, wherein said rear hood also has a tail member covering said rear portion of the engine, said louver panel extending forwardly from a front edge of said tail member.

15. A body paneling according to claim 12, wherein one of said front body cover and said rear hood has hook means for separably joining the front body cover and the rear hood to each other.

16. A body paneling according to claim 12, wherein said front body cover has a pair of recesses defined in rear side portions thereof, and said rear hood has a pair of rear fenders extending forwardly and removably fitted in said recesses, respectively.

17. A motor vehicle according to claim 12, wherein said front body cover comprises a steering column cover member projecting upwardly and covering said steering column, a floor panel extending rearwardly from said steering column cover member, a seat cowl extending upwardly from a rear end of said floor panel and covering said seat bracket, and a rear cowl extending around said seat cowl and covering said front portion of the engine.

* * * * *

UNITED STATES PATENT AND TRADEMARK OFFICE
CERTIFICATE OF CORRECTION

PATENT NO.   :   5,347,799

DATED        :   September 20, 1994

INVENTOR(S)  :   Jun Hosaka et al

It is certified that error appears in the above-identified patent and that said Letters Patent is hereby corrected as shown below:

On the title page, item [73]:

The Assignee's name should read --Honda Giken Kogyo Kabushiki Kaisha--.

Signed and Sealed this

Fourteenth Day of February, 1995

Attest:

BRUCE LEHMAN

Attesting Officer

Commissioner of Patents and Trademarks